(12) United States Patent
Anderson

(10) Patent No.: US 6,718,898 B1
(45) Date of Patent: Apr. 13, 2004

(54) SHOCK ABSORBER SAILING SYSTEM

(76) Inventor: Thomas L. Anderson, 806 Parkway Dr., St. Paul, MN (US) 55106

( * ) Notice: Subject to any disclaimer, the term of this patent is extended or adjusted under 35 U.S.C. 154(b) by 0 days.

(21) Appl. No.: 10/252,490

(22) Filed: Sep. 23, 2002

(51) Int. Cl.$^7$ ................................................. B63H 9/04
(52) U.S. Cl. ................... 114/102.12; 114/109; 114/215
(58) Field of Search .................. 114/102.1, 102.12, 114/108, 109, 111, 215, 214

(56) References Cited

U.S. PATENT DOCUMENTS

| | | | | |
|---|---|---|---|---|
| 3,464,378 A | * | 9/1969 | Veltman ................ | 114/102.12 |
| 4,672,908 A | * | 6/1987 | Goulooze ................ | 114/214 |
| 4,881,481 A | * | 11/1989 | Asmussen ................ | 114/204 |
| 4,955,309 A | * | 9/1990 | Ciccone ................ | 114/230.24 |
| 5,211,378 A | * | 5/1993 | MacKinnon, Jr. ........... | 254/389 |
| 5,947,045 A | * | 9/1999 | Pietro ................ | 114/39.28 |

* cited by examiner

*Primary Examiner*—Stephen Avila
(74) *Attorney, Agent, or Firm*—D L Tschida

(57) ABSTRACT

A resilient, shock absorption assembly that mounts between available sail rigging lines and a boat hull. In one assembly, a piston is resiliently biased relative to a housing and contained spring to permit reciprocating movement. Couplers at distal ends of the piston and housing attach to suitable rigging lines and/or the boat. In other assemblies, resilient elastomer cores bias movement of a piston or cable. In another assembly fitted within a main sail boom, a cable biases the boom rigging lines. In still another construction, an "A-shape", mast replacement framework is secured to pivot from a boat's deck. Resiliently biased cables act as a mast and support a sail boom. One or more separate resilient assemblies can be coupled to the sail. The cable mast and rigging lines are thus made resilient to counterbalance the boat against heeling with the presence of rough water and gusty winds.

18 Claims, 5 Drawing Sheets

SHOCK ABSORBER SAILING SYSTEM

BACKGROUND OF THE INVENTION

The present invention relates to sailboats and, in particular, to a rigging system containing shock absorbed rigging lines to facilitate boat control during gusty conditions.

Sailboats, catamarans and other leisure sailing craft (including land based craft) support numerous sails to harness wind power to propel the craft. Rope rigging is arrayed about each craft and secured to the sails and/or support booms to control the orientation of the sails relative to wind conditions. The ropes or lines particularly anchor the masts, booms and sails. One end of each rope is typically secured to the booms and/or grommets at the sails and the other end is fastened to cleats and anchoring points at the craft. Pulleys, hand cranks and a variety of accessories facilitate the manipulation of the ropes and the sails while under load in the wind. The sails are thus free to move until the anchored lines restrict further movement.

The fastening locations and/or the length of the deployed line restricts the relative angle of the sail to the mast(s) and/or other sails. The rigging is adjusted in relation to the wind to provide force vectors that direct boat movement to desired courses. The rigging must be frequently trimmed or manually attended to optimize movement and accommodate changes in the wind.

Under gusty wind and rough water conditions, a fixed, non-resilient mounting of the rigging can cause the boat to heel erratically to compensate for wind gusts. That is, even though the sails and lines stretch and relax to a limited extent with the additional forces produced with each gust, the forces eventually are transferred to the boat. These conditions can be unnerving to the inexperienced or casual sailor.

The present invention or shock absorber was developed to compensate for rough water and gusty wind conditions. The shock absorber can be incorporated into the rigging of any boat to improve handling. By incorporating one or more shock absorbers into the rigging, the rigging is able to compensate and provide a degree of relaxation in the rigging lines to compensate for sudden gusts and/or swells beyond the normal resilience of the lines and/or sails.

A spring-biased shock absorption assembly is particularly provided that can be secured in series with selected rigging lines. The assembly can also be incorporated into available booms or the hems or pockets sewn into the sails. Resiliently biased reciprocating members in the assemblies extend and retract to compensate for variable wind and water conditions that exceed a defined force and provide a buffer range of additional rigging line movement before the forces are transferred to the hull.

A mast mounting is also disclosed where a cable is suspended from an above-deck, "A"-shaped framework. A shock absorber assembly is fitted between the cable and the hull. A boom and sail are separately deployed along the cable in conventional fashion.

SUMMARY OF THE INVENTION

It is a primary object of the invention to provide a resilient assembly that can be fitted to the rigging lines of a sail powered craft to provide a range of resilient rigging line movement before the variable forces of the winds and water on the sails are transferred to the hull.

It is further object of the invention to provide a resilient rigging assembly that mounts within a boom or hem or pocket at a sail.

It is further object of the invention to provide an assembly having first and second members that are resiliently biased with springs to accommodate reciprocating motion and supporting couplers that facilitate attachment to available rigging lines.

It is further object of the invention to provide a resilient rigging assembly that includes a resiliently biased cable.

It is further object of the invention to provide a resilient rigging assembly that includes an elastomer material or a hydraulic or pneumatic chamber to resiliently bias a reciprocating piston or cable.

It is a further object of the invention to provide a resilient, mast-replacement assembly wherein a framework supports a cable that is resiliently biased relative to the hull.

The foregoing objects, advantages and distinctions of the invention are obtained in several presently preferred shock absorber assemblies that mount between available rigging lines and a boat hull. In a first assembly, a tubular housing having a line or boom coupler at one end contains a piston. The piston is resiliently biased relative to the housing to permit reciprocating piston movement. A coupler at distal end of the piston attaches to a line or anchor cleat at the boat.

In another construction, a housing of an assembly is secured in stationary relation within a sail boom. A cable extends from the housing and over appropriate pulleys to a rigging line coupler.

In still another construction, an "A-shape", mast replacement framework is secured to pivot from a boat's super structure. A cable, which essentially acts as a mast, is suspended from the apex of the framework and is secured to a resilient shock absorber mounted below deck to the cable and boat hull. A boom and sail mount to the cable with appropriate fasteners. One or more separate shock absorbers can be coupled to the boom. The mast cable and rigging lines are thus made resilient.

Still other objects, advantages, distinctions and constructions of the invention will become more apparent from the following description with respect to the appended drawings. Similar components and assemblies are referred to in the various drawings with similar alphanumeric reference characters. The description therefore should not be literally construed in limitation of the invention. Rather, the invention should be interpreted within the broad scope of the further appended claims.

DESCRIPTION OF THE PREFERRED EMBODIMENT

Figure 1:
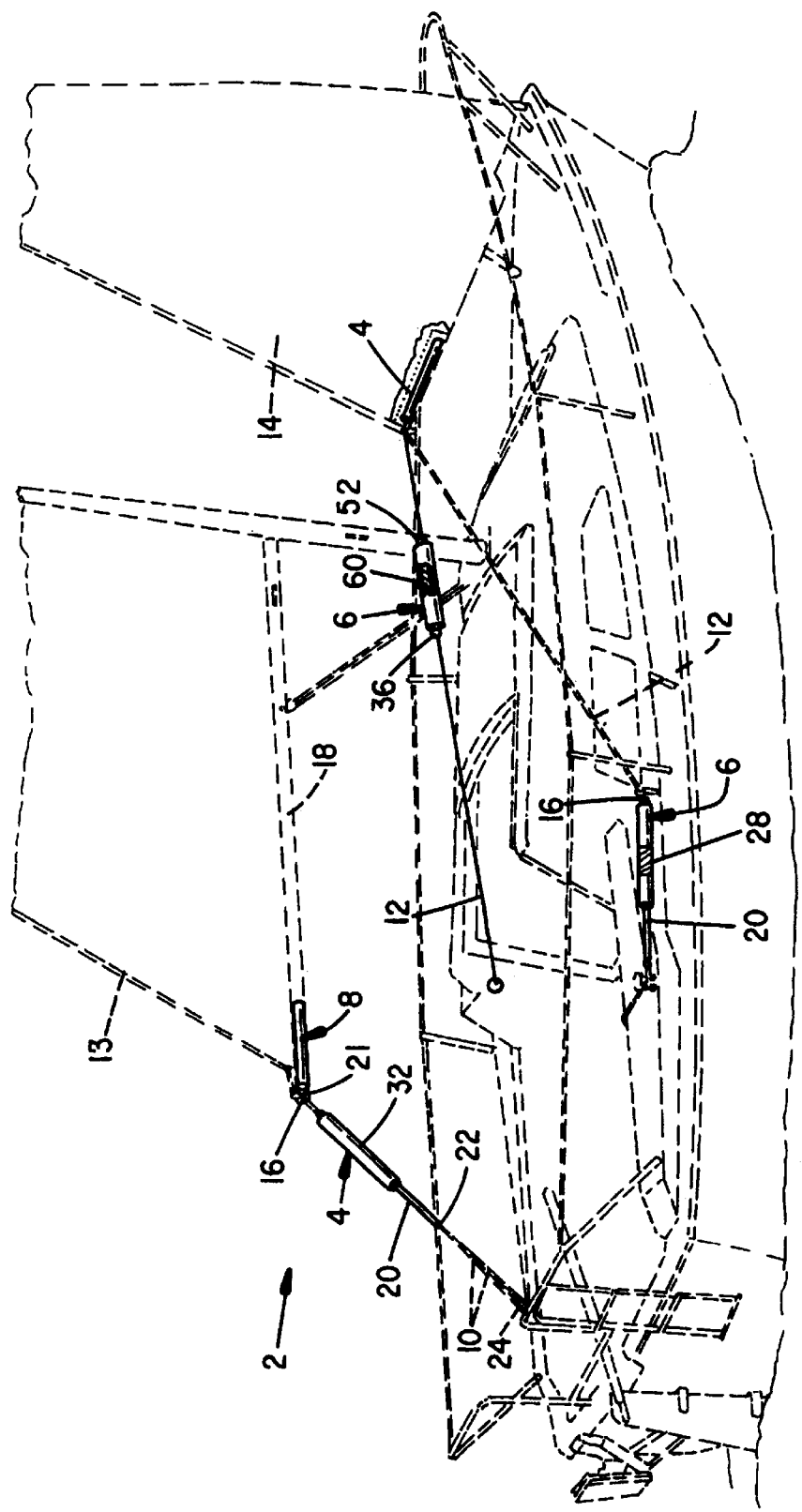
FIG. 1 is a perspective drawing wherein a sailboat is shown in dashed line and wherein the control lines to the main, jib and/or genoa sails are outfitted with several shock absorbers that are located at exposed fastenings and/or within the boom.

Referring to FIG. 1, a view is shown in partial section to a sailboat 2 (shown in dashed line). Mounted about the sailboat 2 and shown in solid line are several resilient, shock absorber assemblies 4, 6 and 8. The assemblies 4, 6 and 8 are generally similar in that each provides a controlled, resilient resistance to reciprocating movement of a piston that responds to forces in excess of a threshold force and over a flexion range of a contained resilient member and/or material. The assembly 4 includes a spring that biases movement of the piston and is shown in greater detail in the exploded assembly drawing of FIG. 2. The assemblies 6 include a compressible elastomer, although the assemblies 6 can be replaced with the assembly 4. Either of the assemblies 4 or 6 may also be constructed with a closed hydraulic or pneumatic chamber that provides a resilient reciprocating motion to a contained piston. The boom-mounted assembly 8, in turn, is shown in greater detail at FIG. 3.

The absorber assemblies 4, 6 and 8 are secured to various of the rigging lines 10 and 12 that control the main sail 13 and jib or Genoa sail 14. As depicted, the main sail 13 is controlled with a single assembly 4. A coupler 16 secures a housing end of the absorber assembly 4 to the end of the main boom 18 and a resiliently biased piston 20 is secured at another coupler 22 or clevis 56 or coupler 22 to the lines 10. The main sail lines 10 are anchored to the aft end of the sailboat 2. Depending upon the size of the main sail 13, the lines 10 can be controlled with one or more pulleys 24 in a block and tackle arrangement to obtain a desired mechanical advantage. The length of the lines 10 are varied to control the orientation of the main boom 18 and main sail 13 relative to the main mast 26.

The jib or Genoa sail 14 is depicted as being controlled with two resilient, shock absorption assemblies 6, which again can be replaced with the assembly 4. The two assemblies 6 used to control the jib/Genoa sail 14 can be arranged in alternative mountings. The two mountings are shown in FIG. 1 with respect to the different mounting positions of the assemblies 6, it being appreciated that either of these mounting positions can be replicated on the other side of the sail.

In the one instance, as shown with respect to the background assembly 6, both assemblies 6 can be mounted in close association to the jib/Genoa 14 with the trailing lines 12 being secured to the port and starboard gunwales in conventional fashion. In the other instance, as shown with respect to the foreground assembly 6, both assemblies 6 can be mounted closer to and/or be directly anchored to the port and starboard gunwales. Difficulties can arise, however, in routing the rigging lines 12 between the assemblies 6 and the sail 14, which makes this mounting less desirable.

Like the main sail 13, the jib/Genoa sail 14 can also be controlled with a single assembly 6. That is, the assembly 6 can be directly attached to the jib/Genoa sail 14 and the rigging lines 12 can be secured to the opposite end of the assembly 6 and be routed to the port and starboard gunwales.

The main sail 13 can similarly be controlled with multiple assemblies 6 or 4 in the fashion of the jib/Genoa sail 14. Alternatively, the assembly 8, as discussed below with respect to FIG. 3, can be mounted within the main sail boom 18. In this rigging arrangement, the boom 18 supports a housing 17 that contains a resiliently mounted cable member 19 that is coupled to the control lines 10 via a pulley 21. In certain circumstances, the boom 18 can be used in lieu of the housing 17 and with only an end stop 82 secured to the in the boom to limit motion of the associated resilient member.

It is also possible to sew either of the assemblies 4 or 6 into a pocket or hem of a sail, such as shown at the jib/Genoa sail 14 of FIG. 1.

In each of the foregoing mountings of the assemblies 4 and 6, appropriate couplers secure the assemblies 4 and 6 to the rigging lines 10 and 12, sails 13 or 14, boom 18, and/or to the gunwales. The attachments allow resiliently mounted pistons within the assemblies to extend and retract with swells, troughs and errant gusts of wind to counterbalance the billowing of the sails 13 and 14 and/or heeling of the boat 2.

Figure 2:
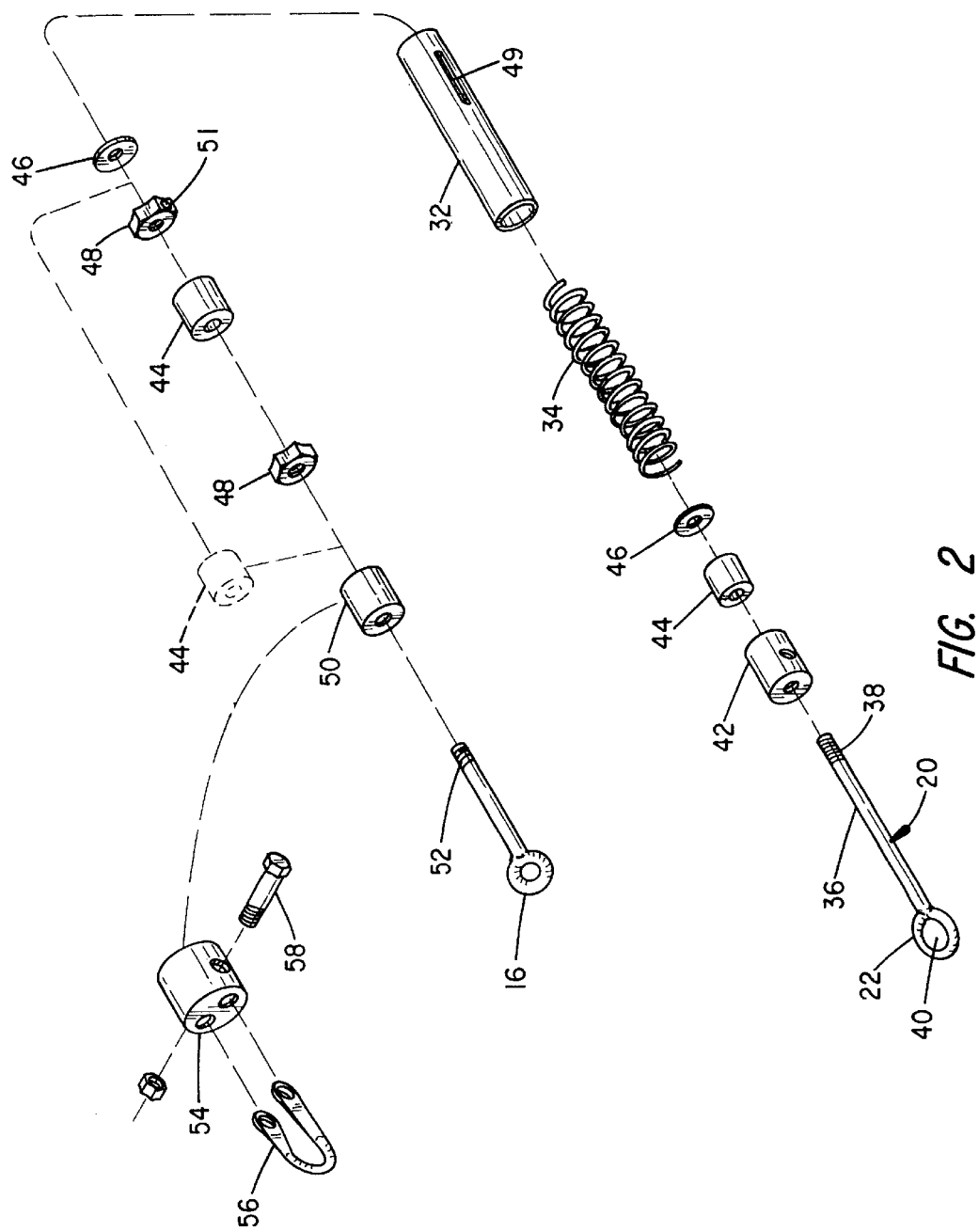
FIG. 2 is a perspective drawing shown in exploded assembly to a two-section shock absorber assembly.

With attention to FIG. 2, a detailed view is shown to the assembly 4. The piston 20 is mounted within a tubular housing 32 and is adapted for reciprocating movement relative to a spring 34. The force exerted by the spring 34 and defined by the spring force constant and range of movement (i.e. compression and expansion) of the spring 34 can be designed as desired to provide a preferred degree of resilience. Presently, it is preferred that the main sail assembly 4 or 8 exhibit an offsetting force in excess of an initial force in the range of 75 to 95 pounds and a travel range of 6 to 10-inches. The jib/Genoa sail assembly 6 desirably exhibits an offsetting force in excess of an initial force in the range of 65 to 85 pounds and a similar travel range of 6 to 10-inches.

The piston 20 is comprised of an eyebolt 36 having threads 38 at one end and an aperture 40 or other suitable coupler connection 22 at the opposite end. The shaft of the eyebolt 36 is supported in concentric relation along the longitudinal center axis of the spring 34. The threaded end 38 mounts through an end cap 42, elastomer bushing 44, washer 46, the spring 34, a second washer 46 and attaches to a nut or threaded fastener 48. As desired, another bushing 44 (shown in dashed line) can be mounted ahead of the nut 46. Upon tightening the nut 48 a degree of pre-loading is established in the spring 34 and bushing(s) 44. Subsequent, forces exerted by a rigging line attached the coupler 22, induces the piston 20 to compress the spring 34 and bushing (s) 44.

The degree of preloading or initial compression of the spring 34 might be varied, once the assembly 4 is fitted to a boat 2, via a slot 49 that allows the nut 48 to be captured with a pin inserted into a hole 51 in the side of the nut 48. Rotation of the eyebolt 36 then determines the preloading.

The opposite end of the housing 32 is fitted with an end cap 50 that is fitted with a second eyebolt 52 and nut 48. A bushing 44 is also positioned in the housing 32 between the nuts 48 to cushion sound that might otherwise emanate from the assembly 4 as the nuts 48 contact each other. A bushing 44 (shown in dashed line) might also be secured to the eyebolt 52 to provide additional resilience to the assembly 4.

Also shown in FIG. 2 are an alternative end cap 54, clevis coupler 56 and fastener 58 that can be secured to the end of the housing 32. It is to be appreciated that a variety of couplers can be secured to the housing 32 and/or piston 20 to facilitate attachment of the assembly 4 the rigging lines of a sailboat 2.

The housing 32 can be constructed of metal or plastic. The end caps 42 and 50 are typically constructed of a similar material and are secured to the housing 32 with threads, welding, adhesive or other suitable fasteners compatible with the housing material and spring force requirements.

The piston 20 is thus free to extend and retract relative to the housing 32. The reciprocating movement is countered via the compression of the spring 34 and/or bushings 44 or any other suitable resiliently compressible material, media or member mounted in the housing 32 to resist movement of the piston 20 relative to the end cap 42. For the assembly 4, the resilience is determined by the collective resilience of the spring 34 and bushings 44.

Appreciating the spring 34 can be replaced with a variety of resilient members or subassemblies, the assembly 6 includes an elastomer core 60 (shown in partial cutaway at FIG. 1) that resists movement of the piston 36. The core 60 can be constructed of a variety of materials including rubber, nylon and plastics that might also be impregnated with additional materials to demonstrate desirable resilient properties.

Alternatively, the piston 20 can be mounted in a housing 32 of an assembly 4 or 6 outfitted with a suitable hydraulic or pneumatic chamber 28 (shown in partial cutaway at FIG. 1). Such a housing 32 would provide a closed chamber, porting, valves and flow paths to a contained gas or liquid to define the travel range and resilient resistance to movement of the piston 20.

Figure 3:
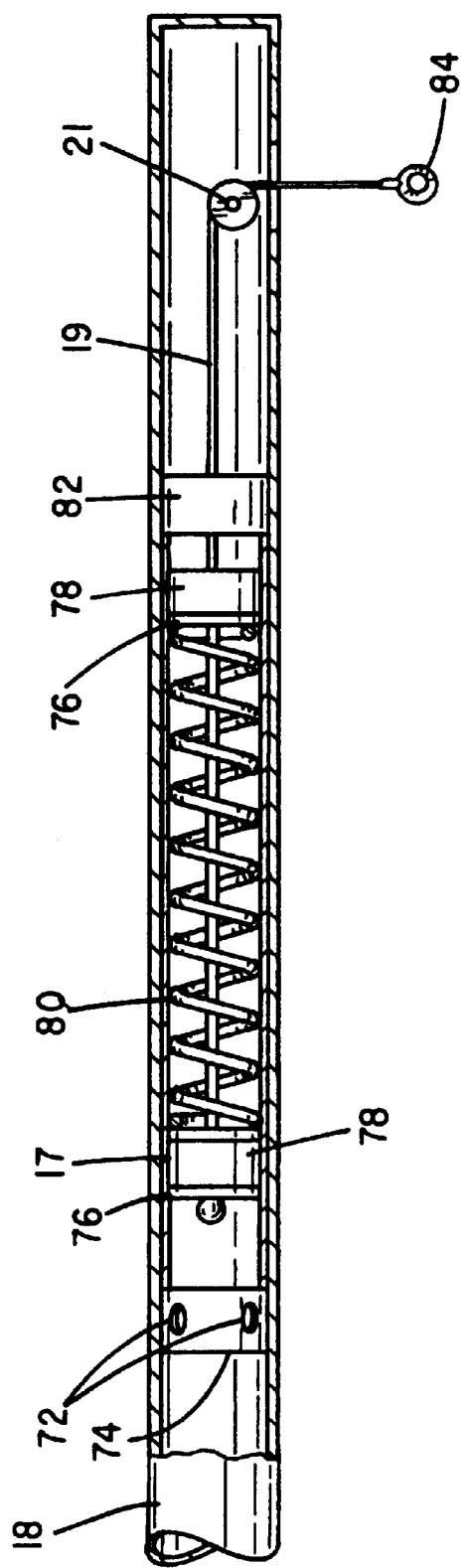
FIG. 3 is a partial section view to a boom mounted assembly.

Directing attention to FIG. 3, a partial section view is shown to the boom assembly 8 as it appears when mounted in a typical main sail boom 18. The housing 17 is particularly mounted in a boom 18 of circular or elliptical shape and secured with one or more pin fasteners that extend through the walls of the boom 18 and apertures 72 in an end cap 74. A length of cable 19 extends through a series of washers 76, resilient bushings 78, a spring 80 and through an end cap 82. The spring 80 and bushings 78 define the resilience of the assembly 8 and dampen any operating noise. The cable 19 is routed over a separately mounted pulley 21 that is secured to rotate within the boom 18. An eyelet 84 fitted to the cable 19 couples to the rigging lines 10.

Figure 4:
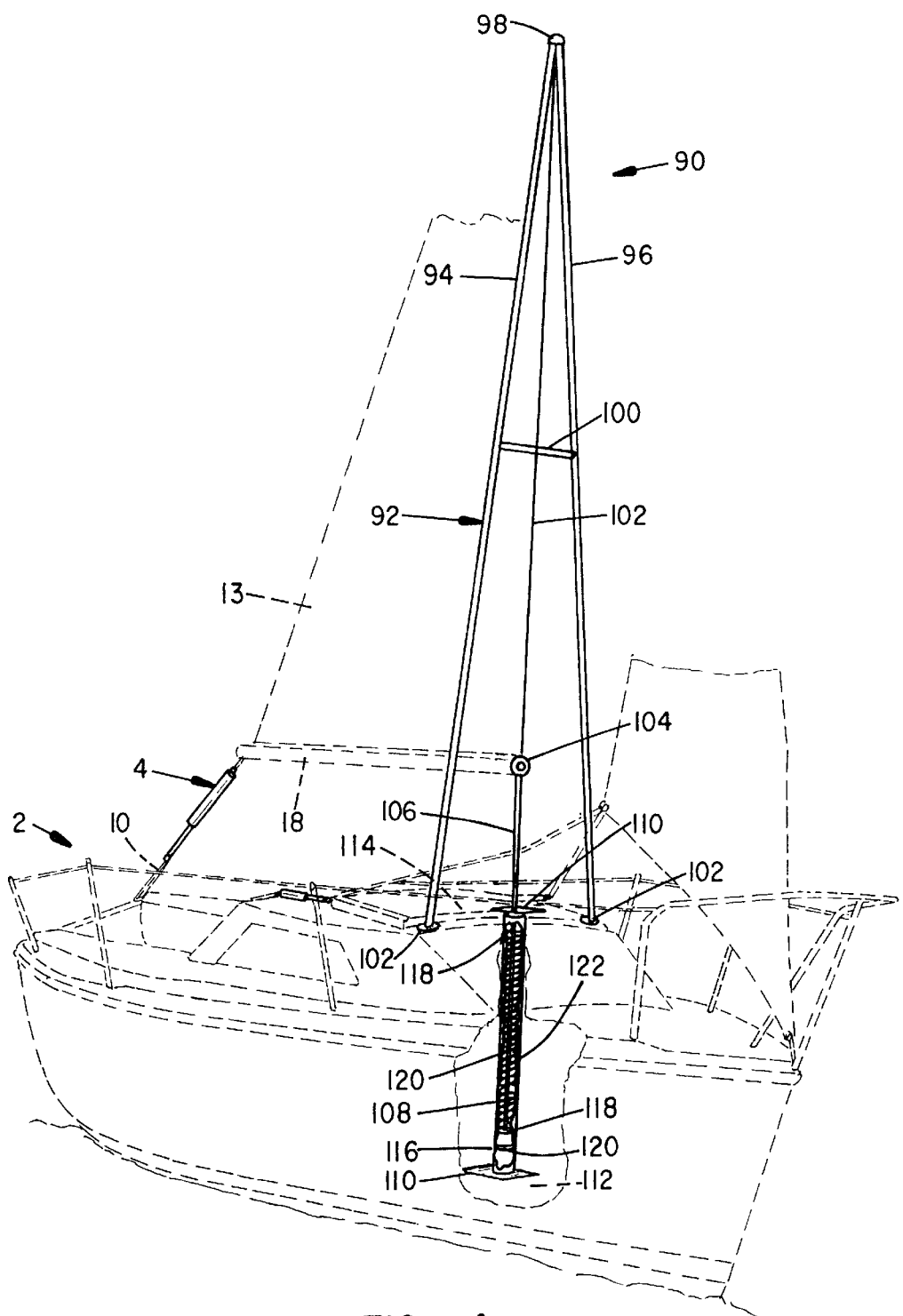
FIG. 4 is a perspective drawing shown in section view to a mast replacement assembly.
Figure 5:
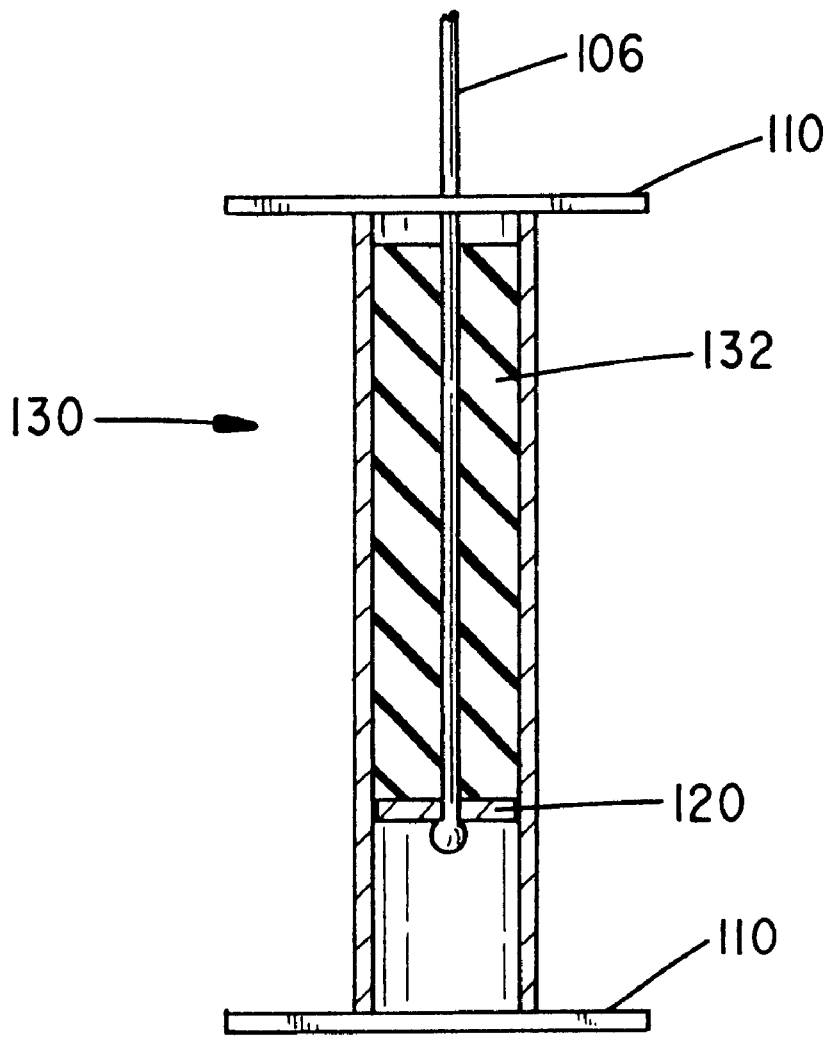
FIG. 5 is a cross section view to an elastomer biased mast replacement assembly.

FIGS. 4 and 5 disclose another construction of the invention and wherein a resilient mast assembly 90 is shown. The assembly 90 provides an "A frame" 92 having upright frame members 94 and 96 that are coupled together at an apex cap 98 and a cross member 100. The lower ends of the members 94 and 96 are mounted to pivot at couplers 102 secured to the deck of the boat 2. The members 94 and 96 are held upright in conventional fashion with suitable guy lines (not shown).

Depending from the cap 98 is a mast cable 102 that is secured to a ring or "eye" fitting 104. Separately extending from the ring fitting 104 is a compression cable 106 that is resiliently biased at a mast post assembly 108. The assembly 108 is secured at end plates 110 to the hull 112 and cabin roof 114. The cable 106 is secured within a tubular housing 116 that is fitted to the plates 110 and through a series of resilient bushings 118, washers 120 and a spring 122. The assembly 108 provides a resilience on the order of 100 to 200 pounds and a range of motion of 5 to 8 inches.

The boom 18 is separately secured to the ring fitting 104 with an appropriate coupler. An additional resilient assembly 4 can be secured to the opposite end to the boom 18 as desired. As necessary additional frame members of guy lines can restrict the movement of the mast and compression cables 102 and 106 relative to the framework 92. The boom 8 however is resiliently restrained to the boat 2 in a fashion that provides two degrees of resilient motion to compensate for boat and sail movements. Wind gusts are particularly countered by the ability of the assemblies 4 and 90 to flex and compensate for extraneous pressures on the main sail 13.

FIG. 5 depicts an alternative mast post 130 wherein the spring 122 is replaced with a resilient elastomer core 132. The core 132 also desirably deadens possible sounds that might emanate as the compression cable 106 extends and retracts from and into the assembly 130.

While the invention has been described with respect to a number of preferred assemblies and considered improvements or alternatives thereto, still other assemblies and rigging arrangements may be suggested to those skilled in the art. It is also to be appreciated that selected ones of the foregoing assemblies and features can be used singularly or can be arranged in different combinations to provide a variety of improved rigging assemblies for sailing craft. The foregoing description should therefore be construed to include all those embodiments within the spirit and scope of the following claims.

What is claimed is:

1. A rigging system for a sail powered craft comprising:
   a) a craft supporting a sail and a plurality of rigging lines coupled between said craft and said sail to control the position of said sail relative to prevailing wind and water conditions; and
   b) a shock absorber mounted in series with at least one of said rigging lines and comprising a housing, a spring and an eyebolt mounted within said housing and wherein said spring compresses and expands in response to the extension and retraction of said eyebolt relative to said housing over a predetermined range of movement in response to winds that exceed a minimum force, whereby movements of said sail are dampened to wind forces within the range of movement of said shock absorber.

2. A rigging system as set forth in claim 1 wherein said sail is supported from a boom and wherein said shock absorber is mounted in a hollow bore of said boom.

3. A rigging system as set forth in claim 1 including first and second shock absorbers coupled to said rigging lines and wherein said first and second shock absorbers are coupled to port and starboard sides of said craft to resiliently bias movement of said sail.

4. A rigging system as set forth in claim 1 wherein said shock absorber is coupled between a main sail boom and said craft.

5. A rigging system for a sail powered craft comprising:
   a) a craft supporting a sail and a plurality of rigging lines coupled between said craft aid said sail to control the position of said sail relative to prevailing winds;
   b) first and second frame members supported in upright relation to said craft and extending to an apex;
   c) a cable depending from said apex to a coupler and a boom that extends from said coupler and wherein said sail is coupled to said cable and to said boom; and
   d) a shock absorber mounted to said craft and including a resiliently biased piston coupled to said coupler and wherein said piston extends and retracts over a predetermined movement range in response to winds that exceed a minimum force, whereby movements of said sail are dampened to wind forces within the range of movement of said shock absorber.

6. A rigging system as set forth in claim 5 wherein said piston comprises a cable, wherein said shock absorber includes a housing and a spring and wherein said spring compresses and expands in response to the extension and retraction of said cable relative to said housing.

7. A rigging system as set forth in claim 5 wherein said shock absorber includes a resilient elastomer member coupled to compress and expand in response to movement of said piston.

8. A rigging system for a sail powered craft comprising:
   a) a craft supporting a sail and a plurality of rigging lines coupled between said craft and said sail to control the position of said sail relative to prevailing wind and water conditions;
   b) a shock absorber mounted in series with at least one of said rigging lines comprising a housing, a spring and a cable mounted within said housing and wherein said spring compresses and expands in response to the extension and retraction of said cable relative to said housing over a predetermined range of movement in response to winds that exceed a minimum force, wherein said sail is supported from a boom and wherein said shock absorber is mounted in a hollow bore of said boom, whereby movements of said sail are dampened to wind forces within the range of movement of said shock absorber.

9. A rigging system for a sail powered craft comprising:
a) a craft supporting a sail and a plurality of rigging lines coupled between said craft and said sail to control the position of said sail relative to prevailing wind and water conditions; and
b) first and second shock absorbers coupled in series with first and second ones of said rigging lines, wherein said first and second shock absorbers are coupled to port and starboard sides of said craft to resiliently bias movement of said sail, and wherein each of said first and second shock absorbers include a resiliently biased member that extends and retracts over a predetermined movement range in response to winds that exceed a minimum force, whereby movements of said sail are dampened to wind forces within the range of movement of said first and second shock absorbers.

10. A rigging system as set forth in claim 9 wherein one of said first and second shock absorbers includes a housing, a spring and a piston mounted within said housing and wherein said spring compresses and expands in responds to the extension and retraction of said piston relative to said housing.

11. A rigging system as set forth in claim 9 wherein one of said first and second shock absorbers includes a resilient elastomer member coupled to compress and expand in response to movement of a piston.

12. A rigging system as set forth in claim 10 wherein said piston comprises an eyebolt.

13. A rigging system as set forth in claim 9 wherein said shock absorber includes a cable coupled to a spring within said housing and wherein said spring compresses and expands in response to the extension and retraction of said cable relative to said housing.

14. A rigging system as set forth in claim 9 wherein one of said first and second shock absorbers includes a housing, an elastomer member and a piston mounted within said housing and wherein said elastomer member compresses and expands in response to the extension and retraction of said piston relative to said housing.

15. A rigging system as set forth in claim 9 wherein one of said first and second shock absorbers includes a housing containing a piston and having a chamber that defines a closed flow path to a flowable medium and wherein said flowable medium opposes the extension and retraction of said piston relative to said housing with a predetermined force.

16. A rigging system as set forth in claim 9 wherein said sail comprises a jib or Genoa sail.

17. A rigging system as set forth in claim 9 including a resilient elastomer member coupled to compress and expand in response to movement of said piston.

18. A rigging system as set forth in claim 17 wherein said piston comprises a cable.

* * * * *